March 24, 1942. C. W. MALIPHANT ET AL 2,277,124
BRAKE CYLINDER DEVICE
Filed Nov. 30, 1939
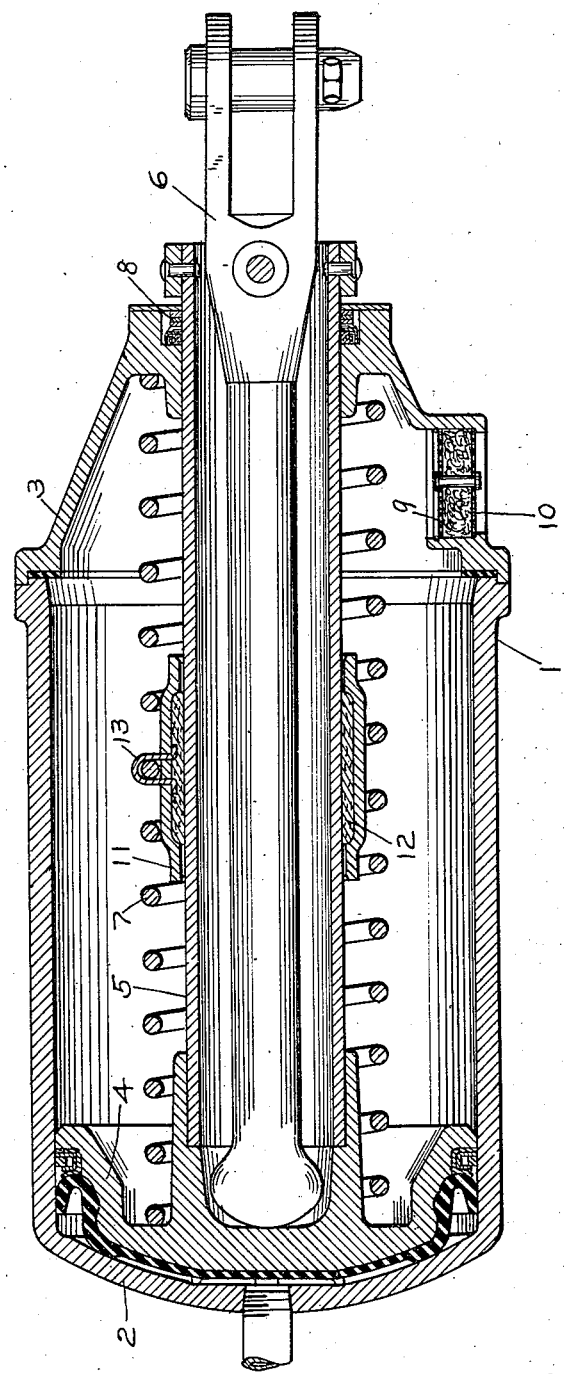
INVENTOR
CHARLES W. MALIPHANT
HAROLD R. SENNSTROM
BY
ATTORNEY Patented Mar. 24, 1942

2,277,124

UNITED STATES PATENT OFFICE 2,277,124

BRAKE CYLINDER DEVICE

Charles W. Maliphant and Harold R. Sennstrom, Wilmerding, Pa., assignors to The Westinghouse Air Brake Company, Wilmerding, Pa., a corporation of Pennsylvania Application November 30, 1939, Serial No. 306,892

10 Claims. (Cl. 60—62.6)

This invention relates to fluid pressure motor devices and more particularly to brake cylinders such as are employed in connection with the fluid pressure brake system used on railway cars.

The usual brake cylinder device comprises a cylinder in which there is operatively mounted a reciprocable piston having a rod which is encircled by a release spring. The spring is adapted to move the piston and piston rod to release position when fluid under pressure is released from the pressure side of the piston and to maintain the piston in this position so long as the cylinder is devoid of fluid under pressure. This spring is interposed between and operatively engages the non-pressure side of the piston and the inside wall of the non-pressure head of the cylinder, and is of necessity quite long, so that it is liable to buckle or sag intermediate its ends. If this should occur, the sagging portion is liable to bear against the piston rod when the piston is in release position. This is objectionable in that when a vehicle on which the brake cylinder is mounted is in motion, vibration, due to the usual service shocks, will be transmitted to the brake cylinder device and will cause the spring to vibrate relative to the piston rod and the degree of such vibration may be great enough to cause the sagging portion to strike or chafe the smooth peripheral surface of the rod with such force as to pit or otherwise roughen this surface.

When fluid under pressure is supplied to the pressure side of the piston the opposing pressure of the release spring is overcome and the piston and piston rod is moved toward application position, causing the spring to be compressed. This may so aggravate the buckling of the spring that the spring may strike or chafe the rod with greater force and thereby cause greater damage to the rod than when the piston is in its release position.

In brake cylinders or similar motor devices the outer end of the piston rod extends to the exterior of the device through an opening provided in the cylinder head. In order to prevent the entrance into the cylinder of dirt and water from the atmosphere around the brake cylinder piston rod it has heretofore been found necessary to provide dirt protecting rings which encircle and contact the piston rod. These rings are necessarily in close sliding contact with the piston rod so that it will be apparent that any roughening of the surface may cause scoring or breakage of the rings when the piston rod is moved therethrough.

The principal object of the present invention is to provide a fluid pressure motor of the above mentioned type with means for supporting the release spring in such a manner as to at all times prevent its direct contact with the piston rod, and to thereby insure against damage to the rod by the spring.

According to this object, the support for the spring comprises a member which has a sliding engagement with the rod, and a further object of the invention is to provide such a support with means for lubricating the rod so as to insure free movement between the rod and support member.

In the accompanying drawing, the single figure is a sectional view of a brake cylinder device embodying the invention.

As shown in the drawing, the brake cylinder comprises a cylinder portion having a pressure head 2 which in the present embodiment of the invention is bulged outwardly and is spherical in shape, and also comprises a non-pressure head 3 which is secured to the other end of the cylinder portion 1 in any suitable manner. The usual piston 4 is slidably mounted in the cylinder and is provided with a hollow piston rod 5 which extends out through an opening in the non-pressure head 3 in the usual manner, the outer end portion of the rod being slidably guided by the non-pressure head.

A solid piston rod, or push rod 6, is positioned within the hollow piston rod and is forced to the right by the piston when fluid under pressure is supplied to the pressure end of the brake cylinder. A spring 7 is provided for biasing the piston and hollow piston rod to the left. This spring encircles the piston rod and is interposed between and operatively engages the non-pressure face of the piston and an inner surface of the non-pressure head.

It will however be understood that the hereinafter described release spring support may be employed with the solid piston rod with which some brake cylinder devices are equipped.

In order to prevent dirt or other foreign matter from entering the non-pressure end of the brake cylinder around the hollow piston rod, the non-pressure head is fitted with metallic packing or protector rings 8 which provide a dirt proof seal between the non-pressure chamber and the atmosphere. The protector rings are preferably of the split ring type as shown, described and claimed in Patent No. 2,135,251 of Clyde C. Farmer, issued to The Westinghouse Air Brake Company on November 1, 1938.

With the non-pressure chamber thus sealed it is necessary to provide breather means for permitting the inhaling and exhaling of air within the non-pressure head, to permit the free to-and-fro movement of the brake cylinder piston. For this purpose an opening 9 is provided in the under side of the non-pressure head 3 and a strainer device 10 is applied to the opening. The strainer device 10 may be of the usual hair filled cartridge type which is suitably mounted in the non-pressure head.

In order to support the release spring 7 in such a manner as to at all times prevent its direct contact with the hollow piston rod 5 a spring support member 11 has been disposed in the cylinder and positioned intermediate the ends of the spring 7. This support member is encircled by the spring and is preferably of sleeve or collar form upon which the spring is adapted to rest, if it has a tendency to sag, and encircles and has a sliding fit with the hollow push rod. The inside diameter of the sleeve is provided with an annular chamber 12 adapted to be filled with felt or any other suitable material for retaining lubricant for lubricating the rod and thereby insuring free movement between the rod and support member 11.

The sleeve is anchored to the spring 7 at a point intermediate its ends in any desired manner. In the present embodiment of the invention we have shown this anchoring of the spring being accomplished by means of a U-shaped bolt or strap 13 which maintains the sleeve or collar positioned with relation to the spring.

It will be noted that when the piston is in its normal inner or release position the member 11 will prevent the spring from sagging into contact with the piston rod.

When fluid under pressure is supplied to the pressure side of the piston 4 the piston and piston rod is moved toward the right, as viewed in the drawing. Movement of the piston 4 and piston rod 5 toward the right causes the spring 7 to compress and move the spring support 11 toward the right. However the piston and piston rod will move faster than will the spring support 11, therefore there will be a relative sliding movement between the member 11 and the rod 5. At the same time the spring support will remain at a point approximately midway of the spring and prevent the spring from buckling and engaging the hollow piston rod.

The annular chamber 12 provided with felt or other lubricant retaining means slides on the rod during the relative movement between the piston rod and the spring support 11, thus lubricating the rod.

While one illustrative embodiment of the invention has been described in detail, it is not our intention to limit its scope to that embodiment or otherwise than by the terms of the appended claims.

Having now described our invention, what we claim as new and desire to secure by Letters Patent is:

1. The combination in a motor device comprising a cylinder having a non-pressure head, of a piston and piston rod slidably mounted in said casing and operable in one direction by fluid under pressure, spring means interposed between said non-pressure head and piston and adapted to move said piston and piston rod in the opposite direction upon the release of the actuating fluid, a sleeve for supporting said spring means intermediate its ends, said sleeve being carried by and slidably mounted on the piston rod, and means for maintaining the sleeve in a position intermediate the length of the spring means.

2. The combination in a motor device comprising a cylinder having a non-pressure head, of a piston and piston rod slidably mounted in said casing and operable in one direction by fluid under pressure, a spring interposed between said non-pressure head and piston and adapted to move said piston and piston rod in the opposite direction upon the release of the actuating fluid, means for supporting said spring intermediate its ends, said means being carried by and slidably mounted on the piston rod, and lubricating means carried by the supporting means for lubricating the piston rod.

3. The combination in a motor device comprising a cylinder having a non-pressure head, of a piston and piston rod slidably mounted in said casing and operable in one direction by fluid under pressure, a spring interposed between said non-pressure head and piston and adapted to move said piston and piston rod in the opposite direction upon the release of the actuating fluid, a collar slidably mounted on said piston rod for supporting said spring intermediate its ends, and means for lubricating said collar and rod, said means being carried by the collar.

4. The combination in a motor device comprising a cylinder having a non-pressure head, of a piston and piston rod slidably mounted in said casing and operable in one direction by fluid under pressure, a spring interposed between said non-pressure head and piston and adapted to move said piston and piston rod in the opposite direction upon the release of the actuating fluid, a collar slidably mounted on said piston rod for supporting said spring intermediate its ends, and means for securing said collar to said spring, said means being carried by said collar.

5. The combination in a brake cylinder comprising a cylinder and a non-pressure head having disposed therein a piston and piston rod, said piston having an application and a release position and being movable by fluid under pressure to said application position, of a spring interposed between said non-pressure head and piston adapted to move said piston and piston rod to release position and maintain said piston and rod in release position upon the release of the actuating pressure, a sleeve encircling the piston rod and encircled by said spring for supporting said spring intermediate its ends, said sleeve being movable with said rod and relative to said rod upon movement of said piston and piston rod to one or the other of said position, said sleeve containing an annular chamber provided in said sleeve adapted to retain lubricant for insuring free relative movement between said sleeve and said rod, and means for anchoring said sleeve to said spring, said means being carried by the sleeve.

6. The combination in a motor device comprising a cylinder having a non-pressure head, of a piston and piston rod slidably mounted in said cylinder and operable in one direction by fluid under pressure, spring means interposed between said non-pressure head and piston and adapted to move said piston and piston rod in the opposite direction upon the release of the actuating fluid, a support member for supporting said spring means intermediate its ends, said support member comprising a sleeve slidably mounted on said rod, and means engaged by the spring means for maintaining the sleeve in a fixed position with relation to the central longitudinal portion of the spring means.

7. A support for a spring control means of the type which encircles a rod, said support comprising sleeve means slidably mounted on said rod, and lubricating means incorporated in said sleeve means and contacting said rod for lubricating the rod.

8. A support for a spring of the type which encircles a rod, said support being designed for slidable supporting engagement with the rod and being adapted to support the spring intermediate the ends of the spring, and means carried by the support for positively securing the support to the spring and for maintaining the support positioned with respect to the spring.

9. A support for a spring of the type which encircles a rod, said support comprising a sleeve portion designed for slidable supporting engagement with the rod, and a member carried by said sleeve portion for positively securing the sleeve portion to the spring and for maintaining the support positioned with respect to the spring, said member being designed to encircle at least one coil of the spring.

10. A support for the intermediate portion of a spring which encircles a rod and is additionally supported at each end, said support comprising a member having slidable engagement with the rod and a clip removably attached to said support for positively securing the support to the spring and for maintaining the support positioned.

CHARLES W. MALIPHANT.
HAROLD R. SENNSTROM.